United States Patent Office 3,494,908
Patented Feb. 10, 1970

3,494,908
SOLID PHASE HYDROLYSIS OF POLYMERS CONTAINING ACETATE GROUPS
Robert A. Hayes, Cuyahoga Falls, Ohio, assignor to The Firestone Tire & Rubber Company, Akron, Ohio, a corporation of Ohio
No Drawing. Filed Nov. 29, 1967, Ser. No. 686,764
Int. Cl. C08f 27/14, 27/16
U.S. Cl. 260—89.1                    5 Claims

ABSTRACT OF THE DISCLOSURE

This disclosures relates to a process for the hydrolysis of polymers containing acetate groups such as polymers and copolymers of vinyl acetate, postacetylated polymers, etc., the hydrolysis being effected on the polymer in bulk form by milling the solid polymer with $Ba(OH)_2 \cdot 8H_2O$. The hydrolysis is performed in the absence of solvent and suspension medium and the extent of hydrolysis can be controlled by limiting the amount of hydrolyzing agent used. The acetate is removed from the polymer in the form of barium acetate.

BACKGROUND OF THE INVENTION

Field of the invention

This invention relates to a process for hydrolyzing polymers containing acetate groups, such as polyvinyl acetate and copolymers of vinyl acetate, etc., while the polymer is maintained in bulk form and essentially free of solvent or other suspension medium.

Description of the related prior art

Various methods of hydrolyzing vinyl acetate polymers and copolymers involve the use of conventional solution and emulsion techniques. In such cases either acidic or basic catalysts are used. These processes use a solvent or an emulsion or suspension medium with the accompanying difficulties in removing the solvent or other dispersion medium as well as various suspension or emulsifying agents from the ultimate hydrolyzed product.

SUMMARY OF THE INVENTION

In accordance with the present invention, it has now been found that polymers having pendant acetate groups such as polymers and copolymers of vinyl acetate, postacetylated polymers, etc., can be hydrolyzed by milling or otherwise bringing the bulk polymer into intimate contact with $Ba(OH)_2 \cdot 8H_2O$. The degree of hydrolysis can be controlled by the amount of hydrolyzing agent used. This process is particularly useful where only a limited amount of acetate groups are contained in a copolymer, or it is desired to hydrolyze only a small percentage of the acetate groups present.

Where it is desired to hydrolyze all the acetate groups present, an excess of the hydrolyzing agent can be used. Otherwise the amount of hydrolyzing agent used is approximately or only very slightly more than the calculated amount for effecting the degree of hydrolysis desired.

The mixing can be conducted on any type of mill, Banbury or other mixing device capable of effecting intimate contact between the polymer and the hydrolyzing agent. The temperature used will be dependent on the plasticity of the polymer, a temperature being selected which will give the polymer sufficient plasticity so that it can be banded on a mill and brought into intimate contact with the hydrolyzing agent. Advantageously the temperature is at least 100° C., preferably in the range of 100–200° C. depending on the plasticity and stability of the polymer at the particular temperature.

The polymer and the hydrolyzing agent are maintained in intimate contact for a sufficient period to effect the desired degree of hydrolysis. Infrared analysis of the product shows a strong OH peak at 3350 cm.$^{-1}$. There is also a considerable decrease in the C=O at 1730 cm.$^{-1}$ and the $CH_3C$=O at 1240 cm.$^{-1}$ The process of this invention is particularly appropriate and advantageous where the presence of the byproduct $Ba(OAc)_2$ is unobjectionable for the ultimate purpose of the polymer or serves as a filler for the polymer composition. However, if desired, the polymer can be treated for removal of the $Ba(OAc)_2$, for example, by washing at 80–90° C. with dilute HCl solution.

The period for reaction will vary somewhat depending on the reaction temperature and the efficiency in bringing the hydrolyzing agent into intimate contact with and uniform distribution throughout the polymer. Generally, however, a reaction time of at least 20 minutes is sufficient. However, where the hydrolysis of substantially all of the acetate groups is to be effected, longer periods are desirable to insure intimate contact between the hydrolyzing agent and substantially all of the acetate groups of the polymer.

DESCRIPTION OF SPECIFIC EMBODIMENTS

The invention is best illustrated by the following examples. These examples are presented merely for the purpose of illustration and are not intended in any way to restrict the scope of the invention or the manner in which it can be practiced. Except where otherwise indicated, parts and percentages are given by weight.

EXAMPLE I

A 200 g. sample of an ethylene-vinyl acetate copolymer containing about 33% vinyl acetate is banded on a warm mill and 150 g. of $Ba(OH)_2 \cdot 8H_2O$ is blended into the polymer. The mill temperature is raised to 80° C. for about 25 minutes. The resultant mixture is heated in a press at 175° C. for one hour. The product is then washed at 80–90° C. with a very dilute solution of HCl for 48 hours, which treatment removes most of the barium residue. Infrared analysis reveals a strong OH peak at 3350 cm.$^{-1}$ and a considerable decrease in the C=O and $CH_3C$=O.

EXAMPLE II

The procedure of Example I is repeated with similar results using in place of the copolymer of that example a postacetylated polymer containing 21 percent by weight of acetate groups therein prepared from a polybutadiene prepared by polymerization of butadiene-1,3 in hexane catalyzed by butyllithium. The starting polybutadiene is one having a molecular weight of about 200,000, about 30% of its unsaturation in the cis form, about 10% in the vinyl-1,2 form and 60% in the trans-1,4 form. The acetylation is effected with glacial acetic acid in the presence of sulfuric acid (96% concentration). A mixture of 200 gms. of polybutadiene in 8 liters of benzene and 200 ml. of sulfuric acid and 3.4 liters of glacial acetic acid are refluxed for 2 hours under vigorous stirring at 80° C. Four grams of a phenolic antioxidant are then added, the mass cooled to 50° C. and 800 grams of NaOH pellets added and stirred for 10 minutes, following which steam distillation is effected until all the benzene is removed. Then filtration, water washing, methanol washing and air-drying are performed.

EXAMPLE III

The procedure of Example I is repeated using a polyvinylacetate homopolymer and only a sufficient amount of hydrolyzing agent to hydrolyze approximately one-third of the acetate groups present. Satisfactory hydrolysis is effected.

As indicated previously, the barium residue can be left in the hydrolyzed product where it serves a useful function as a filler or its presence is not objectionable. In such cases the washing steps are omitted in the preceding examples.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of hydrolyzing a polymer containing acetate groups therein comprising the steps of intimately mixing in the absence of solvent the said polymer in bulk form with at least a stoichiometric amount of $Ba(OH)_2 \cdot 8H_2O$ in bulk form calculated on the amount of acetate groups desired to be hydrolyzed from the polymer and maintaining the polymer and the $$Ba(OH)_2 \cdot 8H_2O$$

in intimate contact at a temperature of at least 100° C. for a period of at least 20 minutes.

2. The process of claim 1 in which the temperature is in the range of 100–200° C.

3. The process of claim 2 in which the polymer is a vinyl acetate polymer.

4. The process of claim 2 in which the polymer is an acetylated butadiene polymer.

5. The process of claim 2 in which the mixing is effected on a mill.

References Cited

UNITED STATES PATENTS

| | | | |
|---|---|---|---|
| 2,950,271 | 8/1960 | Snyder | 260—91.3 |
| 3,300,460 | 1/1967 | Cacca | 260—89.1 |

OTHER REFERENCES

Chem. Abst., 41, 1722g (1947).

JOSEPH L. SCHOFER, Primary Examiner

C. A. HENDERSON, Jr., Assistant Examiner

U.S. Cl. X.R.

260—87.3, 91.3, 94.7, 95